United States Patent
Miles et al.

(10) Patent No.: US 9,863,238 B2
(45) Date of Patent: Jan. 9, 2018

(54) SUBMERSIBLE ELECTRICAL MACHINE AND METHOD

(71) Applicant: Schlumberger Technology Corporation, Sugar Land, TX (US)

(72) Inventors: Jerome Miles, Provo, UT (US); Scott Dahlgren, Provo, UT (US); Craig Boswell, Draper, UT (US); Scott Wolston, Provo, UT (US); Jacques Orban, South Orem, UT (US); Daniel Madsen, Provo, UT (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 788 days.

(21) Appl. No.: 13/954,865

(22) Filed: Jul. 30, 2013

(65) Prior Publication Data
US 2015/0034294 A1   Feb. 5, 2015

(51) Int. Cl.
| | |
|---|---|
| E21B 47/12 | (2012.01) |
| H02K 5/128 | (2006.01) |
| H02K 5/132 | (2006.01) |
| E21B 41/00 | (2006.01) |
| H02K 21/24 | (2006.01) |
| H02K 5/12 | (2006.01) |
| H02K 7/18 | (2006.01) |

(Continued)

(52) U.S. Cl.
CPC ........ *E21B 47/122* (2013.01); *E21B 41/0085* (2013.01); *H02K 5/1285* (2013.01); *H02K 5/132* (2013.01); *H02K 5/12* (2013.01); *H02K 7/1823* (2013.01); *H02K 16/00* (2013.01); *H02K 16/04* (2013.01); *H02K 21/24* (2013.01)

(58) Field of Classification Search
CPC .. H02K 5/132; H02K 5/1285; E21B 41/0085; E21B 47/122
USPC .......................................................... 310/87
See application file for complete search history.

(56) References Cited

U.S. PATENT DOCUMENTS 3,585,426 A * 6/1971 Newell ................ H02K 41/065
310/82
4,410,284 A * 10/1983 Herrick .................. E21B 10/22
175/227

(Continued)

FOREIGN PATENT DOCUMENTS

| JP | 60194738 | 7/2005 |
| JP | 60234443 | 7/2005 |
| WO | 0074214 A1 | 12/2000 |

OTHER PUBLICATIONS

International search report and written opinion for the equivalent PCT patent application No. PCT/US2014/046262 dated Nov. 14, 2014.

(Continued)

*Primary Examiner* — David J Bagnell
*Assistant Examiner* — Kristyn A Hall

(57) ABSTRACT

A submersible electrical machine includes a first magnetic package spaced axially from a second magnetic package, a first stator displaced axially from the first magnetic package by a first air gap, a second stator displaced axially from the second magnetic package by a second air gap. The electrical machine can be operated as a generator or as a motor. When operating as a generator, a turbine can rotate the magnetic packages relative to the stators in response to fluid flowing axially across the electrical machine.

20 Claims, 13 Drawing Sheets

(51) Int. Cl.
    *H02K 16/00*        (2006.01)
    *H02K 16/04*        (2006.01)

(56)                    References Cited

U.S. PATENT DOCUMENTS 5,078,628   A      1/1992   Garis, Jr.
     5,702,273   A     12/1997   Cho et al.
     7,434,634   B1    10/2008   Hall et al.
     7,471,009   B2    12/2008   Davis et al.
  2005/0117453   A1     6/2005   Lehr
  2005/0200210   A1     9/2005   Kotsonis et al.
  2006/0237234   A1*   10/2006   Dennis .................. E21B 4/02
                                                              175/95
  2011/0198848   A1     8/2011   Rytlewski et al.
  2011/0260575   A1*   10/2011   Grann .................... H02K 1/02
                                                             310/261.1

OTHER PUBLICATIONS

International Preliminary Report on Patentability issued in corresponding International application PCT/US2014/046262 dated Feb. 11, 2016. 12 pages.
First Office Action and Search Report issued in corresponding Chinese application 201480051857.4 dated Dec. 2, 2016. 22 pages.

\* cited by examiner

SUBMERSIBLE ELECTRICAL MACHINE AND METHOD

BACKGROUND

This section provides background information to facilitate a better understanding of the various aspects of the disclosure. It should be understood that the statements in this section of this document are to be read in this light, and not as admissions of prior art.

The drilling of oil and gas wells often involves the use of several different measurement and telemetry systems to provide data regarding the subsurface formation penetrated by a borehole and data regarding the state of the drilling process. Electrical and hydraulic power is utilized to drive various downhole systems and tools.

SUMMARY

In accordance to one or more embodiments, a submersible electrical machine includes a first magnetic package spaced axially from a second magnetic package, a first stator displaced axially from the first magnetic package by a first air gap, a second stator displaced axially from the second magnetic package by a second air gap. A non-limiting embodiment of a method includes rotating the magnetic packages in response to a fluid flowing axially across the electrical machine or applying electrical power to the stator. A well system may further include an operational device and an electrical machine disposed in a wellbore, the electrical machine connected to the operational device to drive the operational device in response to fluid flow axially across the electrical machine.

The foregoing has outlined some of the features and technical advantages in order that the detailed description of the submersible electrical machine that follows may be better understood. Additional features and advantages of the submersible electrical machine will be described hereinafter which form the subject of the claims of the invention. This summary is not intended to identify key or essential features of the claimed subject matter, nor is it intended to be used as an aid in limiting the scope of claimed subject matter.

BRIEF DESCRIPTION OF THE DRAWINGS

Embodiments of submersible electrical machines and methods are described with reference to the following figures. The same numbers are used throughout the figures to reference like features and components. It is emphasized that, in accordance with standard practice in the industry, various features are not necessarily drawn to scale. In fact, the dimensions of various features may be arbitrarily increased or reduced for clarity of discussion.

DETAILED DESCRIPTION

Figure 1:
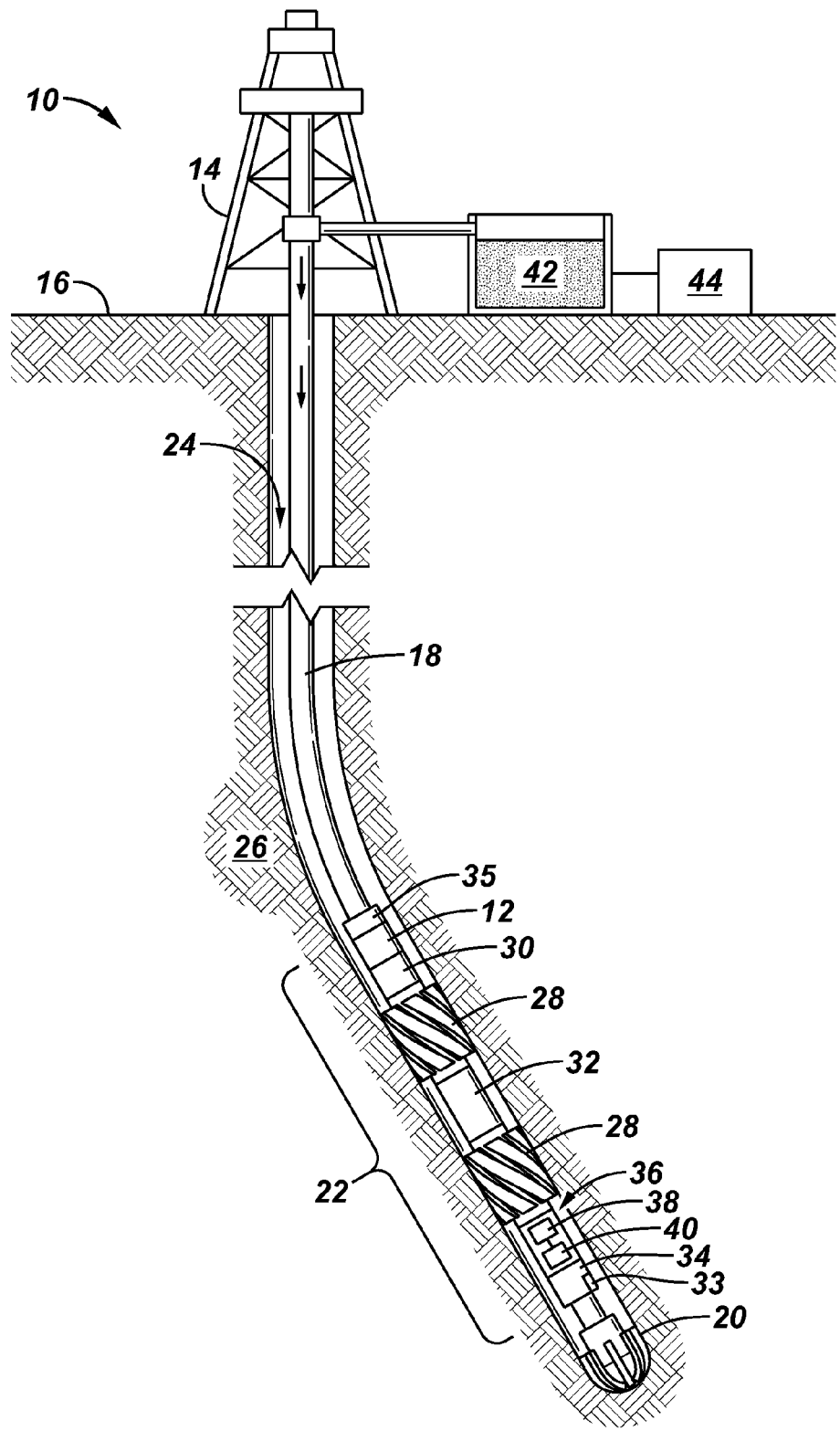
FIG. 1 illustrates a well system in which embodiments of submersible electrical machines and methods can be utilized.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

As used herein, the terms "connect," "connection," "connected," "in connection with," and "connecting" are used to mean "in direct connection with" or "in connection with via one or more elements." Further, the terms "couple," "coupling," "coupled," "coupled together," and "coupled with" are used to mean "directly coupled together" or "coupled together via one or more elements." As used herein, the terms "up" and "down"; "upper" and "lower"; "top" and "bottom"; and other like terms indicating relative positions to a given point or element are utilized to more clearly describe some elements. Commonly, these terms relate to a reference point as the surface from which drilling operations are initiated as being the top point and the total depth, or measured depth, being the lowest point, wherein the well (e.g., wellbore, borehole) is vertical, horizontal or slanted relative to the surface.

Embodiments of electrical machines, i.e. motors and generators, are disclosed that can be submerged in surrounding well fluids providing direct connection to devices (e.g. valves, impellers). In accordance with embodiments the electrical machine may not utilize a separator, e.g. rotary seal, to separate the electrical machine from the well fluid. The electrical machines can be constructed to operate in dirty fluids, for example loaded with particles, and or chemically aggressive well fluids.

The submersible electrical machines, systems and methods may be utilized in various applications, including without limitation, well drilling, well completions, wireline tools, and production systems such as artificial lift equipment. As will be understood by those skilled in the art with benefit of the disclosure, the submersible electrical machines are not limited to wellbore applications.

In accordance to one or more embodiments a submersible electrical machine includes a first rotor magnetic poles spaced axially from and fixedly attached to a second rotor magnetic poles, a first stator face displaced axially from the first magnetic poles by a first air gap, a second stator face displaced axially from the second magnetic poles by a second air gap, and bearing assemblies supporting the rotating elements and capable to operate in the surrounding fluids, even if the surrounding fluid is chemically aggressive or loaded with particles. In some generator electrical machine embodiments, the rotor elements can be coupled to an impeller to rotate the rotors relative to the stators in response to fluid flowing axially across the machine. A non-limiting embodiment of a method includes rotating the electrical machine in response to a fluid flowing axially across the electrical machine. In some motor electrical machine embodiments, the rotor is connected to a motor output shaft to drive in rotation an operational device such as, and without limitation, valves, restrictors, coring barrels, and small drill bits for example via gear reducers.

A well system in accordance to one or more embodiments includes an operational device and an electrical machine disposed in a wellbore, the electrical machine is functionally connected to the operational device to drive the operational device. For example, a generator type of electrical machine may respond to fluid flow axially across the electrical machine in a direction substantially parallel to the electrical machine. In accordance with one or more embodiments, the electrical machine includes two stators that may be connected in series or parallel allowing similar currents in the two stators. This allows proper axial force balancing on the rotor. The connection between the two stators can be performed via electrical switches allowing interconnect change from series to parallel, while maintaining same current symmetry between the two stators. The ability to switch the stators from series to parallel allows the output voltage to be reduced by half at high RPM (flow rates) eliminating over-voltage on electronics and in many cases flow kits, e.g. two separate tools to handle wide flow rate range. The switching can be controlled by logic versus rotation speed and system loading allowing for a wide operating range (voltage versus RPM). Typically hysteresis between the switchings "from series to parallel" and "from parallel to series" is performed with some hysteresis to avoid instability at switching voltage output. Delay between switchings can also be added to limit instability between multiple switchings.

The addition of the power output provided by the stator can be performed in the AC domain or in the DC domain, after rectification per stator or group of phases. After the DC rectification, the rectified signal may have some ripple. When operating after separate DC rectification, it may be advantageous to have a physical phase shift between the signals rectified independently. This phase shift allows for reducing the level of the ripple after summing the rectified signals. The minimum ripple condition is obtained for a phase shift of 60 degrees between the electrical signals of the windings to sum after the independent rectification. The phase shift between the windings can be obtained by a mechanical phase shifts between the two stators or the two rotors. The mechanical phase shift depends on the desired phase shift of the electrical signals corrected by the number of poles.

As an alternative method to switching from series to parallel, the switching can be modified to disconnect half of the winding in place of reconnecting in parallel. This simplifies the switching system, but may create some small noise increase and some axial load on the thrust bearings for example due to the non-symmetry of the current in the two stators. Similar switching from series to parallel and reverse can also be applied for motor applications to increase the motor operating range with more torque at low RPM while keeping a relatively high back-EMF.

Electrical performance (power or torque) is primarily limited by the diameter of the electrical machine. To allow proper installation in a drilling tubular or any well hardware, this overall diameter is limited. For increased electrical performance, axial stacking (or axial cascading) can be performed. For example, in case of a motor, multiple rotors may be connected to the same motor output shaft.

FIG. 1 illustrates an example of a well system 10 in which embodiments of submersible electrical machines, generally denoted by the numeral 12, may be utilized. Submersible electrical machine 12 may be utilized in production and injection well systems and in non-wellbore systems. Electrical machine 12 may be utilized for example as a generator (alternator) or as motor to supply power (e.g. electrical, hydraulic, mechanical) to drive an operational device. In accordance to one or more embodiments, submersible electrical machine 12 is an axial magnetic flux device.

Well system 10 is illustrated in FIG. 1 as a drilling system, in particular, a directional drilling system. Depicted well system 10 includes a rig 14 located at a surface 16 and a tubular string 18 (e.g. drill string) suspended from rig 14. A drill bit 20 is disposed with a bottom hole assembly ("BHA") 22 and deployed on tubular string 18 to drill wellbore 24 into subsurface formation 26. The bottom hole assembly includes capabilities for measuring, processing, and storing information, as well as communicating with the surface. The location at which electrical machine 12 is shown in FIG. 1 is solely for the purpose of identifying and describing electrical machine 12 with reference to a well system and the depicted location is not intended to be limiting in any manner. As will be understood by those skilled in the art with benefit of this disclosure, electrical machine 12 may be located in various positions including being located within various tools of the well system, such as and without limitation to the collars connected in the tubular string, in the measurement and or logging while drilling tools, and in the rotary steering device.

The depicted BHA 22 includes stabilizers 28, a measurement-while-drilling tool ("MWD") 30, a logging-while-drilling tool ("LWD") 32, and a steering device 34. An attitude hold controller 36 is disposed with BHA 22 and operationally connected with rotary steering device (RSS) 34 to maintain drill bit 20 and BHA 22 on a desired drill attitude to propagate wellbore 24 along a desired trajectory. RSS 34 may include one or more operational devices, such as valves and the like, to actuate pads 33 and steer BHA 22. Depicted attitude hold controller 36 includes a downhole processor 38 and sensors 40, for example direction and inclination sensors. An electrical source 35, such as a battery, is illustrated located with BHA 22. Electrical source 35 may be connected with one or more of the operational devices as well as being connected with electrical machine 12. Electrical source 35 may be connected to electrical machine 12 to provide electrical power for example to one or more stators to operate electrical machine 12 as a motor to provide mechanical or hydraulic power to an operational, i.e. operated, device. Electrical source 35 may be connected with an output of electrical machine 12 to receive and store electrical power generated by electrical machine 12. Electrical source 35 may be located at the surface with reference to electrical power being provided from source 35 to electrical machine 12.

Electrical machine 12 may be functionally connected to one or more of operational devices 30, 32, 34, 38 and 40 to supply power that may be utilized wholly or in-part to operate, i.e. drive, the connected operational device. The operational devices that may be functionally connected to and powered by electrical machine 12 are not limited to the operational devices depicted and described with reference to FIG. 1. The depicted operational devices are representative of tools and systems that may include elements such as, and without limitation to, electronic systems, sensors, transmitters, receivers, actuators, valves, telemetry systems, batteries, hydraulic pumps, axial pumps, and centrifugal pumps.

Electrical machine 12 can be utilized as a motor to actuate or drive elements for example of operational devices 30, 32, 34. For example, with reference to steering system 34 electrical machine 12 can be utilized to rotate a valve 160 (FIG. 14) for example of RSS 34. The valve may direct for example drilling mud 42 to push pad 33 of steering device 34 against the wall of the wellbore and orient the bit drill and the wellbore trajectory in the desired direction. The mud feeding may be synchronized to the rotation of the drill string 18 and BHA 22 so that the well deviation trend is steadily follows the desired direction. The synchronization may be accomplished by controller 36 which may control the rotation of electrical machine 12 inside steering system 34.

Electrical machine 12 can be utilized for example as a motor inside MWD tool 30 to actuate the mud pulse modulator for example. With regard to LWD tool 32, electrical machine 12 can be utilized as a motor for example to drive actuators for example inside LWD pressure measurement tool to actuate the radial locking of the collar in the wellbore, to draw (i.e. suction) formation fluid into the LWD tool for pressure measurement and sampling, and to control valve setting for LWD sampling process.

With reference to FIG. 1, a fluid 42, such as drilling fluid or mud, can be circulated by surface pump 44 from surface 16 through the axial bore of tubular string 18 and returned to surface 16 through the annulus between tubular string 18 and formation 26. According to one or more embodiments, electrical machine 12 is submerged in fluid 42. In accordance to one or more embodiments, flowing fluid 42 drives electrical machine 12 to generate electrical power.

Figure 2:
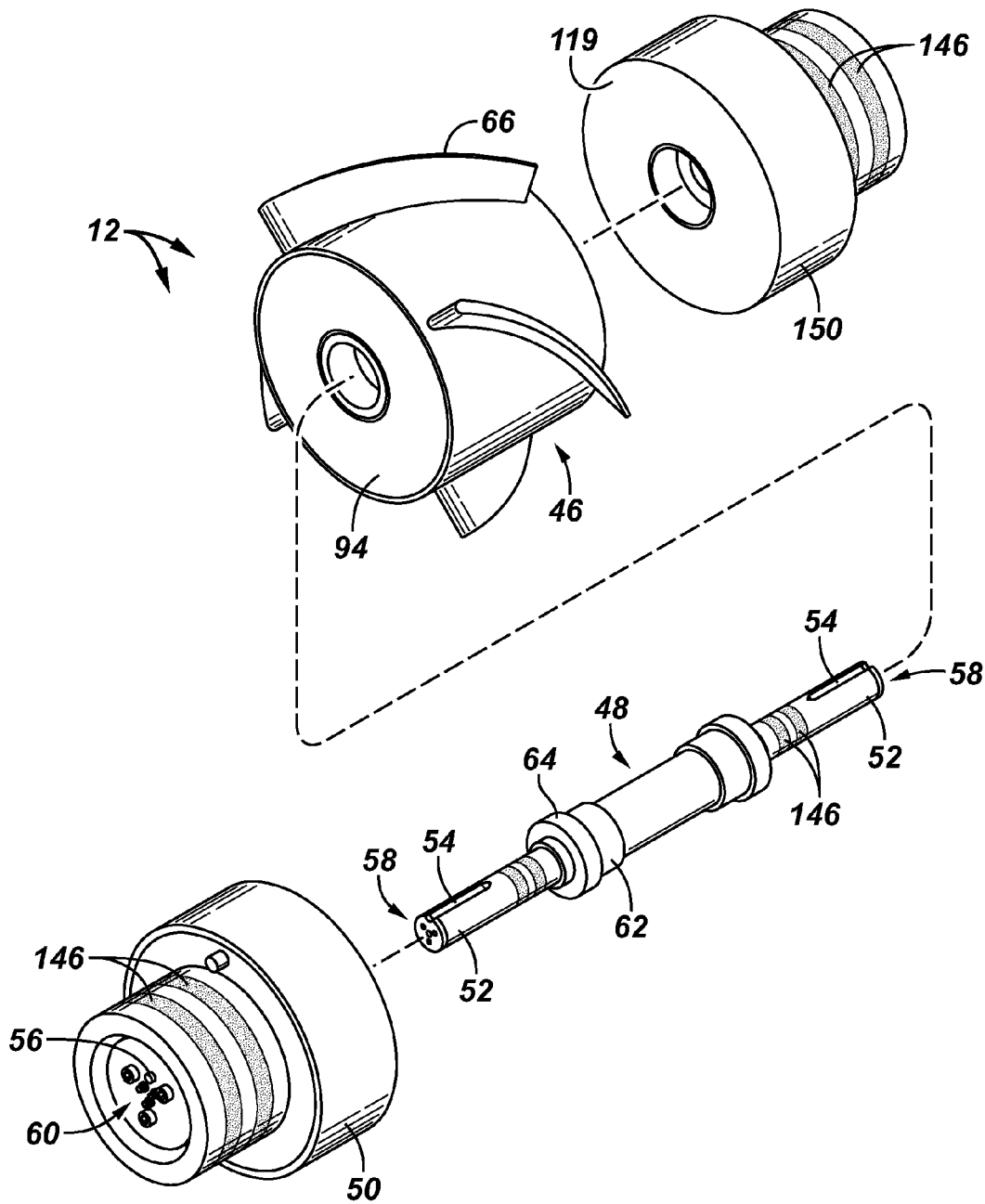
FIG. 2 illustrates a submersible electrical machine in accordance to one or more embodiments.

FIG. 2 is an exploded view of an electrical machine 12 according to one or more embodiments. Electrical machine 12 includes a magnetic rotor 46 rotationally coupled to an elongated member or axle 48 and positioned between stators 50, 150. Axle 48, for example a spindle or shaft, may be a rotating member or a fixed member. Each end 52 of axle 48 includes an alignment groove 54 for connecting the respective stators 50, 150 in the appropriate orientation. For example, stators 50, 150 include an alignment pin 56 for mating with alignment groove 54. Each axle end 52 is depicted with a first connector 58, for example sockets, cooperative with a second connector 60, for example pins, of stators 50, 150 to operationally connect the respective stators to the ends of the axle. This keying system permits aligning and maintaining stators 50, 150 for example in a constant angular phase. The stators may be installed on the same angular position or in different angular positions for example to allow signal outputs of the stators to have a desired phase between them. In the depicted embodiment, axle 48 is a non-rotating member. Rotor 46 may be mounted on axle 48 for example via radial bearings 62 and thrust bearings 64. In the embodiment of FIG. 2, rotor 46 is disposed with turbine 66 to induce rotation of rotor 46 relative to stators 50, 150 in response to fluid, for example a drilling fluid, flowing across turbine 66.

Figure 3:
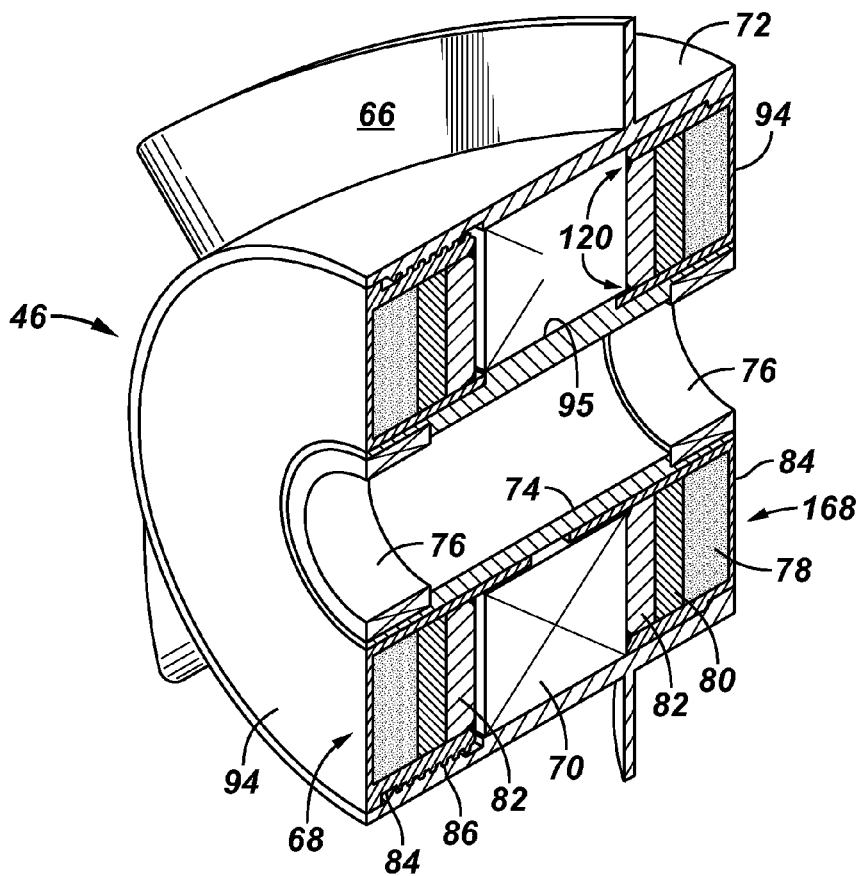
FIG. 3 illustrates a pair of fixedly attached rotor magnetic packages of a submersible electrical machine in accordance to one or more embodiments.

FIG. 3 illustrates a pair of magnetic packages fixedly attached in a rotor 46 configuration with a pair of rotor faces oriented in opposite directions. Rotor 46 includes two magnetic packages 68, 168 to create magnetism in the respective stators 50, 150 (FIG. 2). Magnetic packages 68, 168 are formed in an annular shape and disposed between an outer sleeve 72 and an inner sleeve 74. Magnetic packages 68, 168 are fixedly attached to one another by an attachment, for example outer sleeve 72. In this example, turbine 66 is carried on the outside of sleeve 72 such that fluid flowing axially across the machine will act on turbine 66 to induce rotation. Bearings 76, for example journal bearings, may be disposed in inner sleeve 74 to mate for example with bearings 62, 64 (FIG. 2). The extremities of bearings 76 act against bearing 64 (FIG. 2) which may ensure the proper axial location of rotor 46 relative to stators 50, 150. In use, electrical machine 12 is submerged in the well fluid which invades the space about bearing 62 and 76. The bearings may be constructed of a wear resistant material such as, and without limitation, polycrystalline diamond ("PCD").

Each magnetic package 68, 168 includes a plurality of magnetic poles 78 that creates the magnetism in the respective stators. According to one or more embodiments, magnetic packages 68, 168 include a seal plate 82 and a holder 84 forming a sealed rotor. Seal plate 82 may connected with holder 84 by a connection 120, illustrated by weld 120, or otherwise secured in a manner to seal magnetic poles 78 from the submerging fluid. In FIG. 3, magnetic package 68 is connected with outer sleeve 72 by threads 86 thereby locking magnetic packages 68, 168 with inner sleeve 74 and outer sleeve 72. FIG. 3 is one example of fixedly attaching the rotor magnetic packages together in a selected alignment. The rotor can be sealed, for example similar to the stator housing, or unsealed allowing fluid to seep through the housing.

Figure 4:
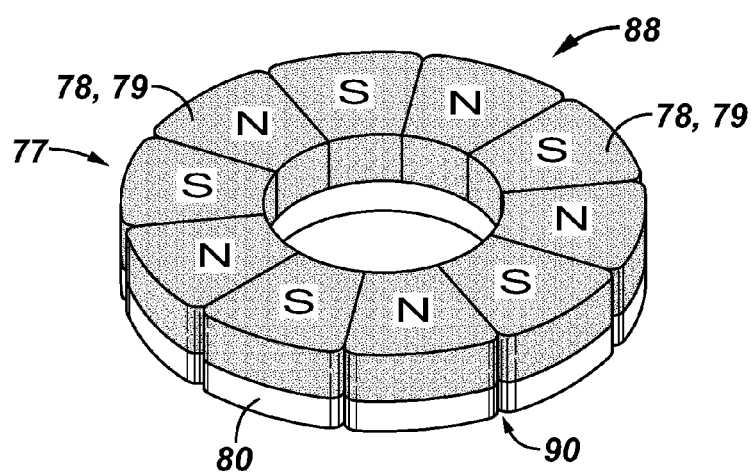
FIG. 4 illustrates a magnetic assembly of a submersible electrical machine in accordance to one or more embodiments.

FIG. 4 illustrates a magnetic assembly 88 according to one or more embodiments. Magnetic poles 78 are arranged side-by-side in alternating magnetic orientation to form an annular ring 77. Each of the magnetic poles 78 may be an individual magnet 79. Ring 77 of magnetic poles 78 is held against a magnetic path plate 80 that is constructed of a high magnetic permeability metal with high magnetic saturation. Magnetic assembly 88, with or without a path plate, may include locators 90 (e.g. notches) to locate and orient magnetic poles 78 in the magnetic package (FIG. 5) and to orient magnetic poles 78 of one rotor magnetic package with the magnetic poles of the one or more other cooperative rotor magnetic packages (see, e.g. FIGS. 3, 8, 12). Magnets 79 may be permanent magnets, for example, to operate the electrical machine as generator, DC-brushless motor, or a synchronous motor.

In accordance to one or more embodiments, magnetic assembly 88 may constructed as a single annular magnet ring 77 that has been polarized with the pole configuration illustrated for example in FIG. 4. Accordingly, magnets 79 represent magnetic poles 78, which are arranged alternating North, South in FIG. 4.

Figure 5:
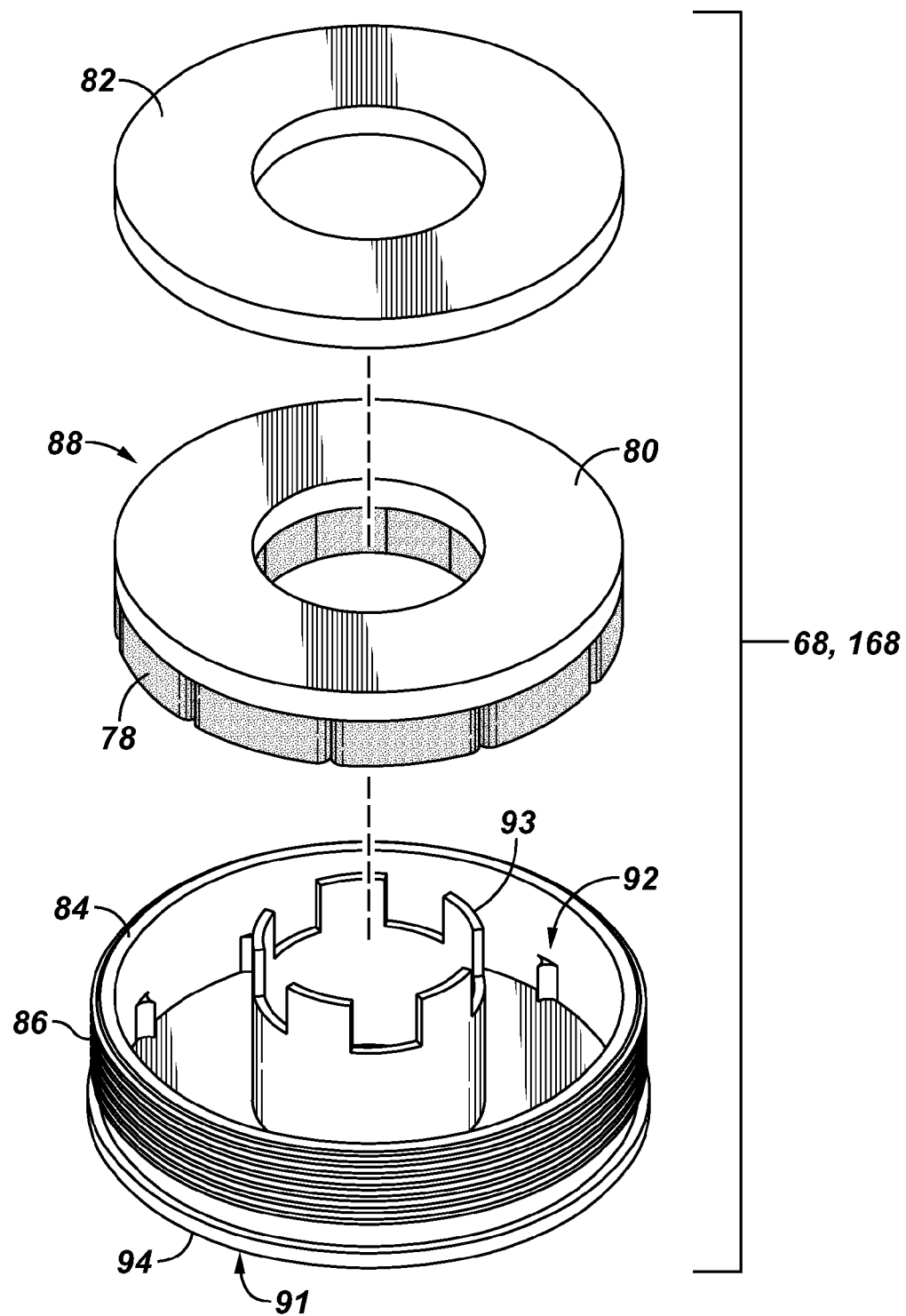
FIG. 5 illustrates a magnetic package of a submersible electrical machine in accordance to one or more embodiments.

FIG. 5 is an exploded view of a magnetic package 68, 168 in accordance to one or move embodiments. Magnetic poles 78 are disposed in holder 84 having a face 94, i.e. rotor face. In this example, magnetic assembly 88 is disposed in holder 84 and sealed. Locators 90 engage with keys 92 of holder 84. Holder 84 may alignment features for aligning with the magnetic poles with the magnetic poles of the other cooperative and fixedly attached magnetic package. For example holder 84 includes holder keys 93 for engaging cooperative keys 95 (FIG. 3) to properly align the magnetic poles 78 of the fixedly attached rotor magnetic packages 68, 168.

Depicted holder 84 is made of non-magnetic material, for example steel, having a low magnetic permeability. In some embodiments the magnetic permeability is approximately 1. Non-magnetic material may or may not be used on the rotor housing. The non-magnetic holder 84 (e.g. housing) allows the magnetic flux to penetrate the stator to induce flux into the stator windings. Seal plate 82 is installed on the back side of magnetic assembly 88. The back side of the magnetic assembly is depicted by magnetic path plate 80 and the front side, which is oriented toward the associated stator, is identified by magnetic poles 78. Seal plate 82 is connected to holder 84 by a weld 120 (FIG. 3) or otherwise secured in a manner to seal magnetic assembly 88 from the submerging fluid, which may be aggressive. For example, the submerging fluid, such as drilling fluid, may have an aggressive pH level. Magnetic packages 68, 168 (FIGS. 3, 5) may be constructed to reduce or eliminate any voids that can collapse when disposed in high pressure environments.

Holder 84 may be constructed with a wear resistant material. In particular, rotor face 94 of holder 84 may be formed of a wear resistant material or as a layer of material deposited on the face of holder 84. Rotor face 94 is exposed to the submerging fluid, for example drilling fluid 42 in the well system of FIG. 1. Examples of wear resistant materials include without limitation tungsten carbide, ceramics and boronized material. A coating or layer 91 of wear resistant material may be deposited on rotor face 94. For example, a thin tungsten carbide layer 91 or a ceramic layer 91 may be deposited by a Detonation-gun process. Rotor faces 94 of the respective magnetic packages 68, 168 may also be formed of a flexible material to allow movement in high pressure environments. For example, the electrical machine may be exposed to high pressures, e.g. 25,000 psi, which will induce deformation in holder 84 and in particular in rotor face 94. The front faces of the respective magnetic packages 68, 168 form the opposing rotor faces 94 of rotor 46.

Figure 6:
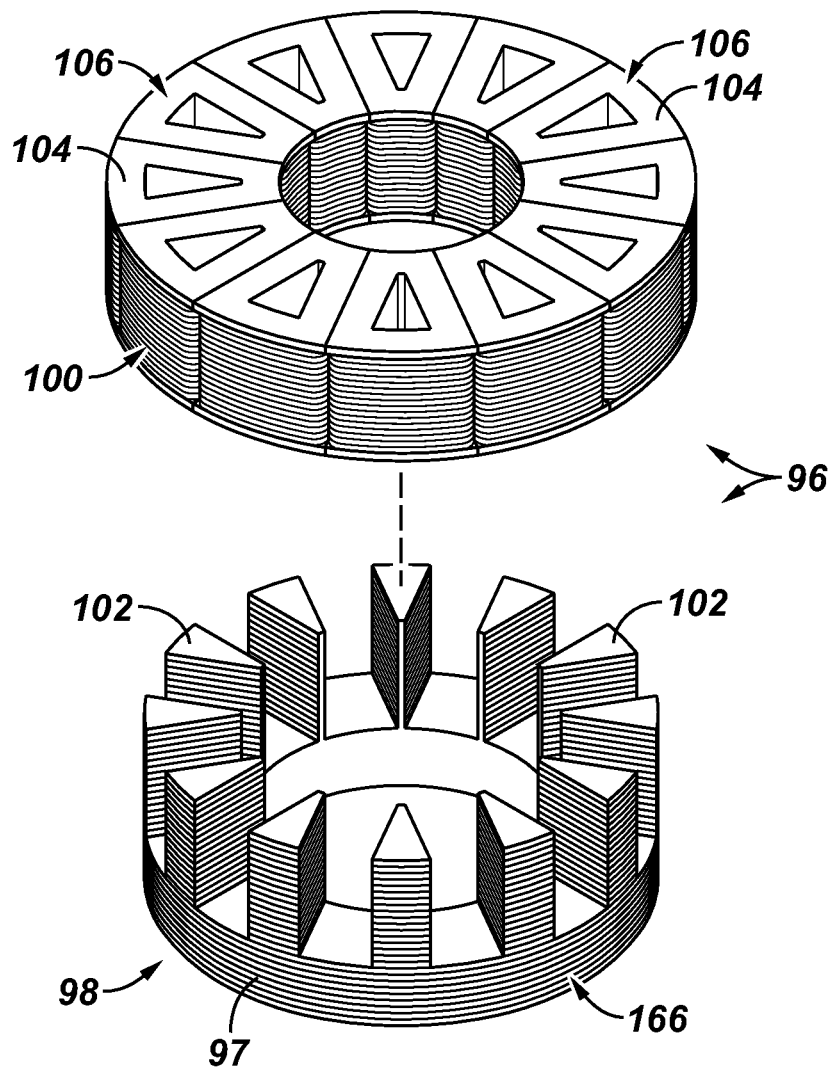
FIG. 6 illustrates a stator core of a submersible electrical machine in accordance to one or more embodiments.

FIG. 6 is an exploded view of a stator or stator core 96 comprising a magnetic core 98 and windings 100. Magnetic core 98 is constructed of a high magnetic permeability material, or metal, supporting high flux density, i.e. high saturation levels. Depicted magnetic core 98 is constructed of wound, thin insulated metal tape. The spiral or circular laminations 166, with layer insulation, minimize the eddy currents within stator core 96 when the rotor is turning and generating alternating flux. Some of the wound material is removed to create the stator poles 102 and continuous ring 97. The magnetic core 98 material may be cut away for example utilizing an electrical discharging machine ("EDM") process to form stator poles 102.

Winding 100 is formed by wrapping wire over an insulator support 104 (FIG. 7) forming each pole winding 106. Winding 100 and the insulator support are then installed on magnetic core 98 to form stator core 96. Several stator poles 102 may be connected in series to create one phase. To limit the number of interconnects, and increase reliability, the phase windings may be wound awith a continuous wire.

Figure 7:
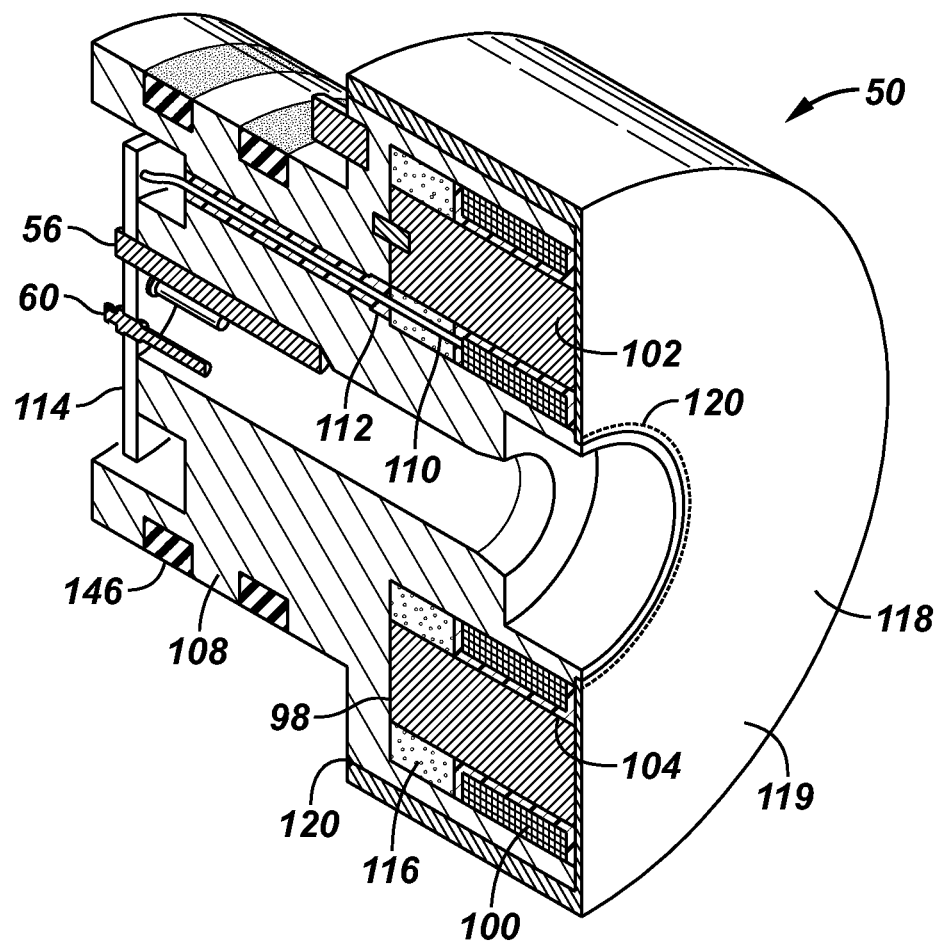
FIG. 7 illustrates a stator of a submersible electrical machine in accordance to one or more embodiments.

FIG. 7 illustrates a sealed stator, for example stator 50, according to one or more embodiments. Stator core 96 (FIG. 6) is installed with a stator body 108. Phase wires 110 are run from the stator phase winding through a passage insulator 112 to a wiring interconnect 114, for example a printed circuit board ("PCB"). Wiring interconnect 114 is connected to stator body 108 and oriented by placement of orienting alignment pin 56. Proper orientation of wiring interconnect 114 facilitates direct connection to first connector 58 (FIG. 2) of axle 48 via second connectors 60. Stator windings 100 and magnetic core 98 are potted with a potting material 116, for example and without limitation epoxy glue, to minimize any voids around the magnetic core 98 and windings 100. A stator cover 118 is installed over stator core 96 and secured in place, for example by welds 120, sealing stator windings 100 and magnetic core 98 with body 108 and from potential short-circuit and chemical attack by the submerging fluid. When operating in pressurized fluid, stator potting 116 may support the stress induced by the fluid pressure and transmitted to the inside of the stator by the stator cover.

If stator cover 118 is metallic, e.g. a conductor, it will be a source of eddy currents when the magnetic rotor is turning. Constructing stator cover 118 of a high resistivity metal, such as INCONEL 718, can minimize the eddy currents. According to one or more embodiments, stator cover 118 is constructed of a low magnetic permeability material and as thin as possible, in particular stator face wall 119, to ensure that most of the magnetic flux from the rotor (i.e. magnetic package) penetrates into the stator poles 102. In use, stator face wall 119 is oriented toward a rotor face 94 (FIG. 5).

Figure 8:
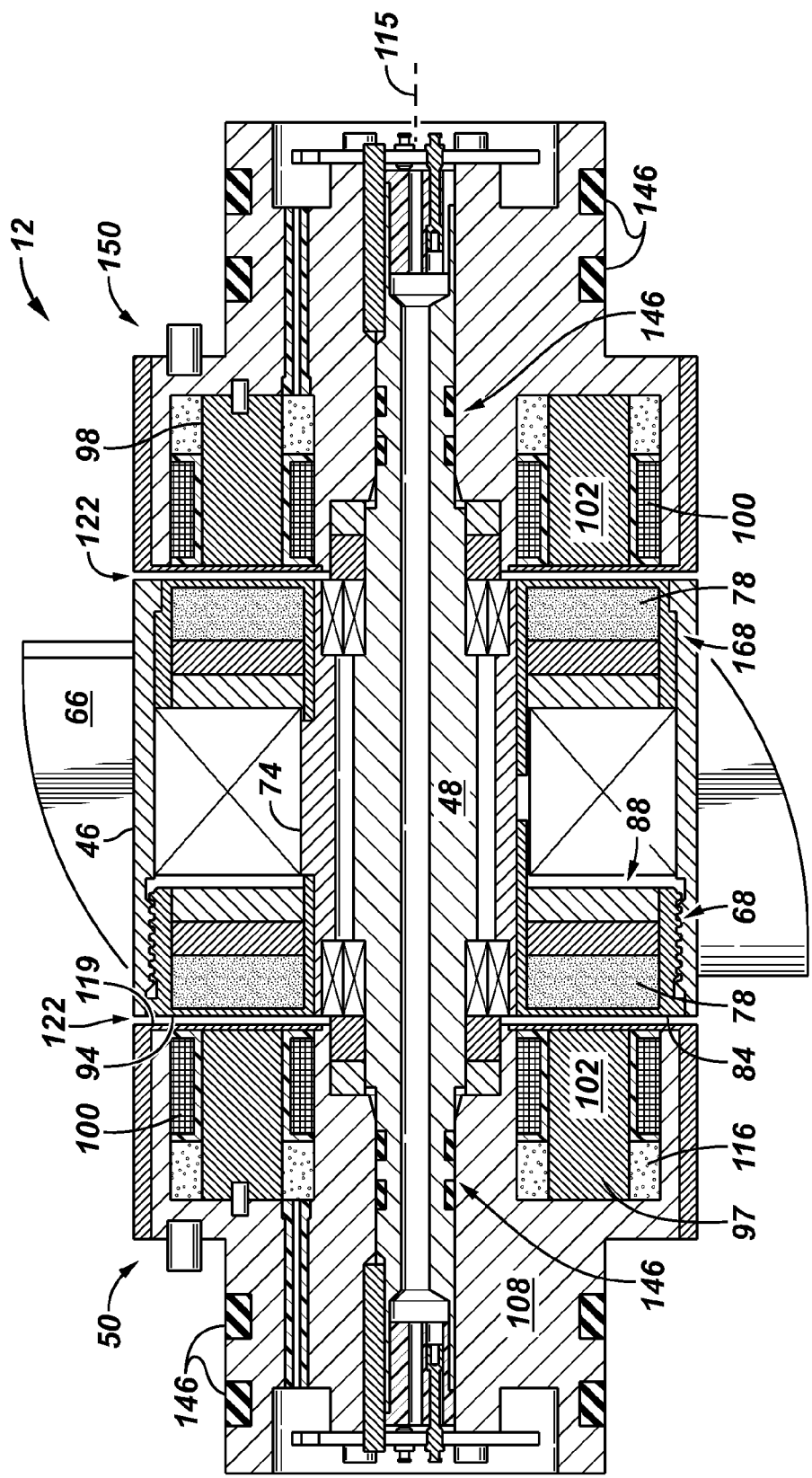
FIGS. 8 to 11 illustrate submersible electrical machines in accordance to one or more embodiments associated for example with dynamic hydraulic machines to convert hydraulic power into electrical power or to convert electrical power into mechanical or hydraulic power.

FIG. 8 illustrates an assembled electrical machine 12 in accordance to one or more embodiments. Pair of magnetic packages 68, 168 are fixedly attached as a rotor 46. Rotor 46 is rotatably disposed between left stator 50 and right stator 150. Stator poles 102 are aligned parallel with axle 48, referenced also as the longitudinal axis 115 of electrical machine 12. Stator poles 102 of left stator 50 are located axially across an air gap 122 from magnetic poles 78 of magnetic package 68 and stator poles 102 of the second, or right in FIG. 8, stator 150 are located axially across an air gap 122 from magnetic poles 78 of the magnetic package 168. The ring of magnetic poles 78 are oriented perpendicular to axis 115. Stator poles 102 extend axially and perpendicular to the plane of ring 77 (FIG. 4) of magnetic poles 78.

With reference to FIGS. 4, 6, and 8, in response to rotor 46 rotating about axis 115, magnetic flux passes from magnetic poles 78 of magnetic package 68 into stator poles 102 of stator 50 and magnetic flux passes from magnetic poles 78 of second magnetic package 168 into stator poles 102 of stator 150. For example, with reference to stator 50 and magnetic package 68, magnetic flux passes from one magnetic pole 78 of magnetic package 68 into a first stator pole 102 of stator 50 and passes to continuous ring 97 of the stator core and the magnetic flux then returns toward first magnetic package 68 via an adjacent pole 102 of stator 50. The two magnetic packages 68, 168 are angularly aligned. In accordance with embodiments, the angular positions of the magnetic packages ensure that the signal output of the two stators 50, 150 are in phase. In some embodiments, a specific phase difference between the stator outputs may be desired. The specific phase difference may be imposed by the key system illustrated for example with reference to FIGS. 4 and 5. The stators 50, 150 may be aligned and maintained in the desired angular phase for example with a keying system previously described with reference to FIG. 2. As the magnetism only crosses the thin, high electrical resistance walls of rotor faces 94 and stator faces 119, there is minimum loss due to eddy currents. Magnetic coupling systems can have loss due to eddy currents.

As noted above, electrical machine 12 can be utilized as an electrical generator or as a motor. For example, electrical machine 12 corresponds to a synchronous motor when the magnets 79 (FIG. 4) are permanent magnets. In one example, the electrical machine is utilized as a DC brushless motor. The positions of the rotor magnetic poles are tracked and the current is controlled into the 3-phase windings to ensure the resultant magnetic flux for the current in the 3-phases is at 90 degrees from the rotor magnetic flux. With the 90 degree flux orientation, electrical machine 12 delivers a high torque and minimizes inductive effect.

Figure 9:
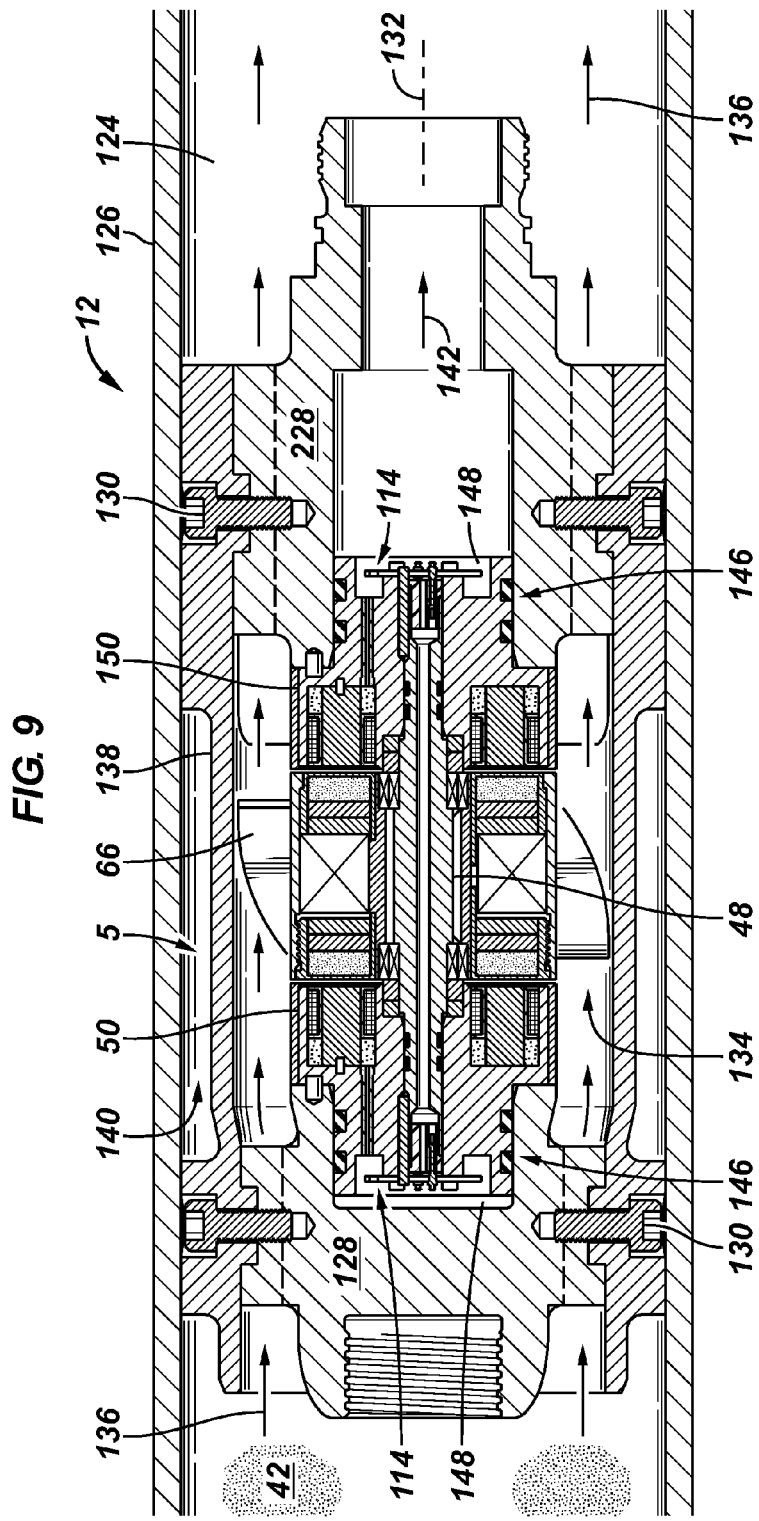

FIG. 9 illustrates an example of a submersible electrical machine 12 in cross-section in accordance to one or more embodiments. With additional reference to FIGS. 1-8, machine section 5 (e.g. generator or motor section), which includes two rotors, two stators and two air gaps are illustrated disposed in axial bore 124 of a tubular housing or collar 126. In the illustrated embodiment the two rotors, i.e. magnetic assemblies or packages, are fixedly attached in a rotor 46 configuration. In operation, collar 126 may be connected within tubular string 18 of well system 10 (FIG. 1). Body members or centralizers 128, 228 are connected respectively with stators 50, 150 in this embodiment to centralize machine 5 in collar 126 and or shroud 138. Wiring interconnects 114, e.g. circuit boards, may be sealed from the submerging fluid by seals 146 and the connection of the body members to the stators. For example, an atmospheric chamber 148 is formed at the left wiring interconnect 114 between stator 50 and body member 128. The atmospheric chamber 148 at the right wiring interconnect 114 may be formed when an operated device, for example MWD 30 module, is connected with right body member 228.

Body members 128, 228 include connectors 130 to contact or engage housing 126 and position electrical machine 12 in axial bore 124. Electrical machine 12 may be centralized within housing 126, for example with axle 48 coaxially aligned with the longitudinal axis 132 of housing 126. The longitudinal axis 115 (FIG. 8) of machine 12 may be described with reference to the axis of axle 48. Electrical output, for example DC voltage, may be output from body member 228 in the direction of output arrow 142 to an electrically operated device such as, and without limitation, MWD 30 of FIG. 1.

Machine section 5 is connected within axial bore 124 to form a driving fluid flow path 134, for example an annular channel, through which fluid 42 is directed to flow across turbine 66 causing the magnetic packages in rotor 46 to rotate. Fluid 42 flowing along driving fluid flow path 134 is depicted by arrows 136. Driving fluid flow path 134 may be the only fluid flow path across machine section 5 in accordance to one or more embodiments.

Electrical machine 12 may include a shroud 138 for example as illustrated in FIG. 9. Machine section 5 is disposed inside of shroud 138 forming driving fluid flow path 134 between shroud 138 and machine section 5 and forming a bypass channel 140 between housing 126 and the outside diameter of shroud 138. A portion of the flowing fluid 42 can flow through bypass channel 140. The flow in bypass channel 140 may be controlled for example by a restrictor positioned in bypass channel 140.

Figure 10:
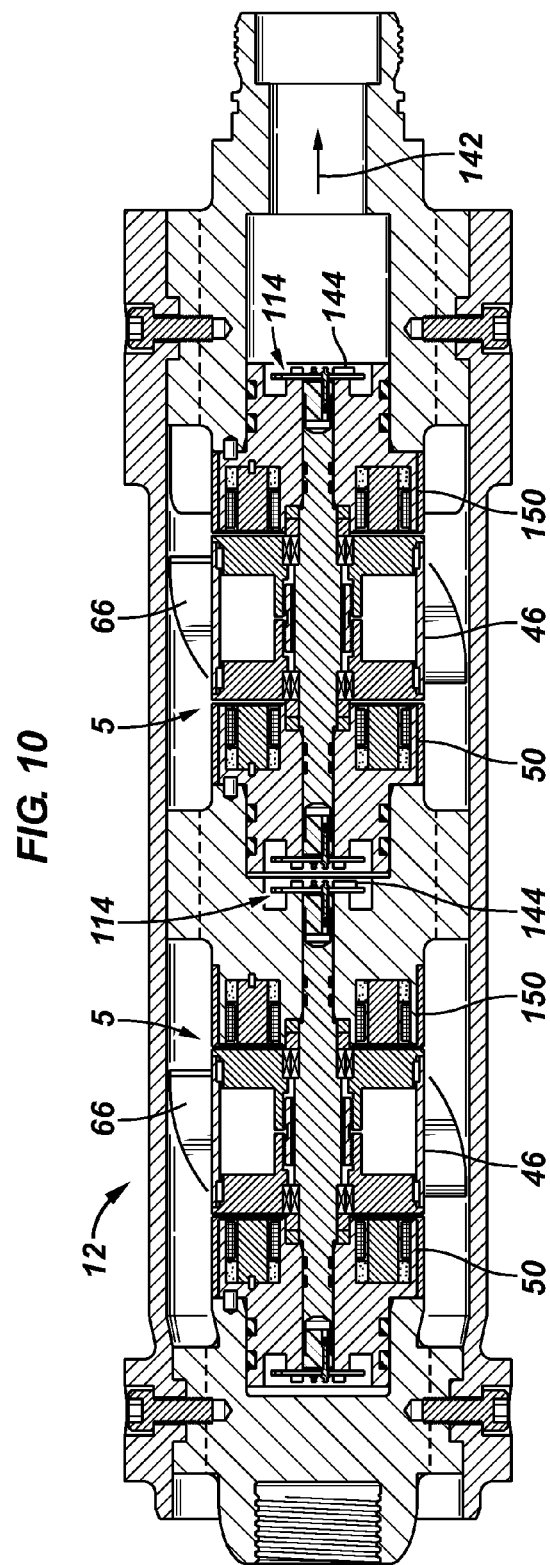

FIG. 10 illustrates an example of an electrical machine 12 in cross-section in accordance to one or more embodiments. In this example, multiple machine sections 5 are stacked axially to increase the power output relative to the output of a single machine section 5. In this example, the electrical output from each machine section is rectified and the outputs of the multiple machine sections 5 are added after rectification. In the depicted embodiments, wiring interconnects 114, e.g. printed circuit boards, include rectifiers 144. In this configuration there may not be a need for mechanical alignment between the multiple machine sections 5. When machine sections 5 are operated as a generator, the AC to DC rectifier 144 of each section 5 may be utilized and the rectified electrical outputs summed for a single higher electrical power output. When electrical machine 12 is utilized as a motor for example to drive an independent impeller 66, the machine sections 5 may be driven by an electrical supply 35 (e.g. see, FIGS. 1, 12-14).

Figure 11:
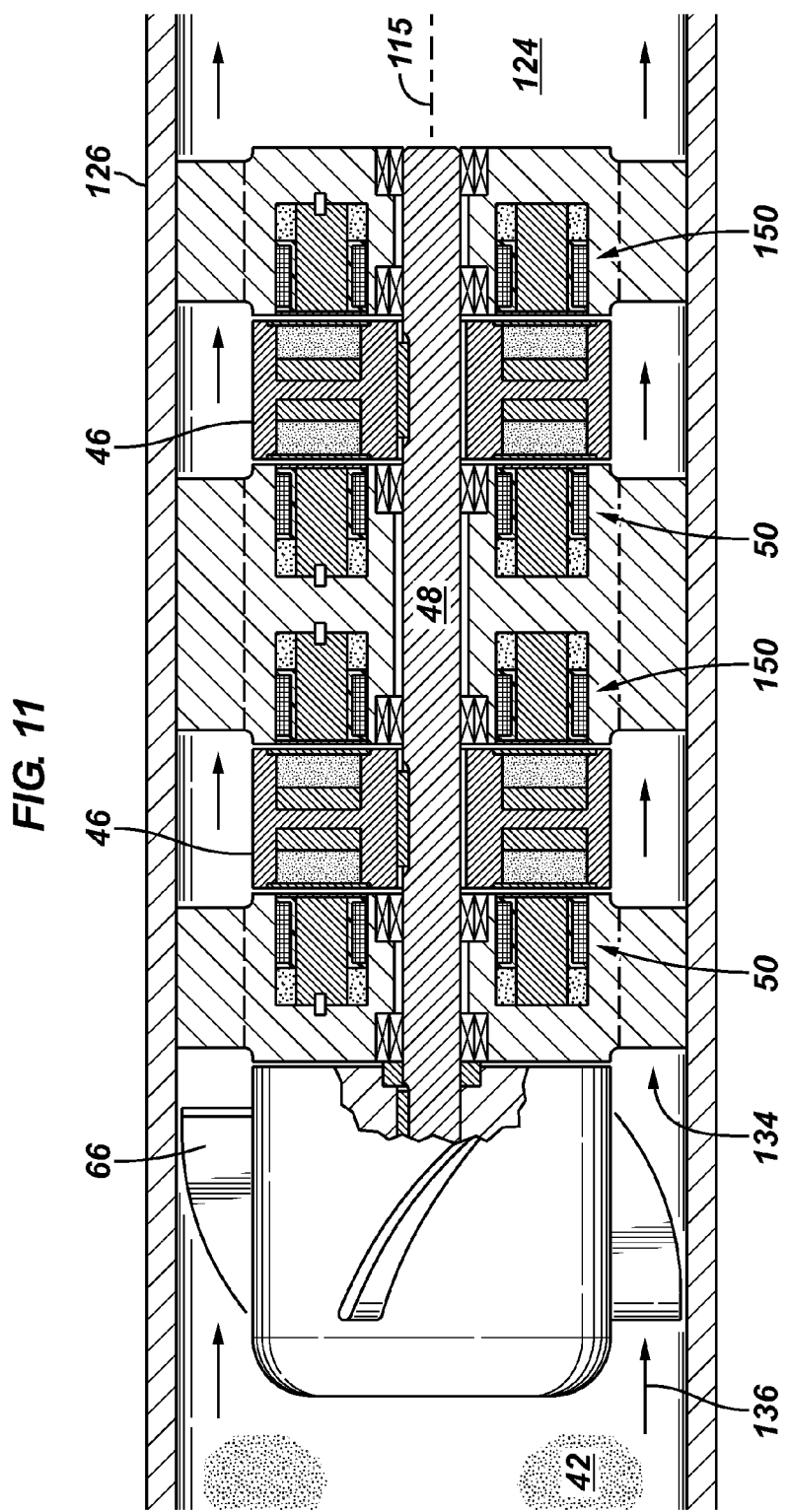

FIG. 11 illustrates an example of an electrical machine in accordance to one or more embodiments. In this example, multiple machine sections 5 are stacked. Each machine section 5 includes a pair of rotor magnetic assemblies disposed in a rotor 46 that is positioned between a pair of stators 50, 150. The rotors 46 of the machine sections 5 are interconnected, fixedly attached, by axle 48 to ensure that each rotors 46 are geometrically aligned and the machine section 5 outputs are in phase, allowing a combination of outputs of corresponding phase. In the depicted example, turbine 66 (impeller) is connected to axle 48 to induce rotation in axle 48 and the fixedly attached rotors 46 in response to fluid 42 flowing through driving fluid flow path 134. With reference to FIG. 3, rotor 46 may include two fixedly attached magnetic packages 68, 168. In the FIG. 11 embodiment, a turbine is not attached to the exterior of the rotor assemblies.

Electrical machine 12 as illustrated in FIG. 11 may be operated as a motor by supplying electrical power, for example from electrical supply 35 (FIG. 1, 12-14) to stators 50, 150. The machine sections 5 rotate axle 48 in this example which can rotate a connected operational device such as and without limitation a pump to generate flow in a tubular. Other non-limiting examples of operational devices include a valve (e.g. control valve) of steering device 34 (FIGS. 1, 14) or mud pulse generator of MWD tool 30.

Figure 12:
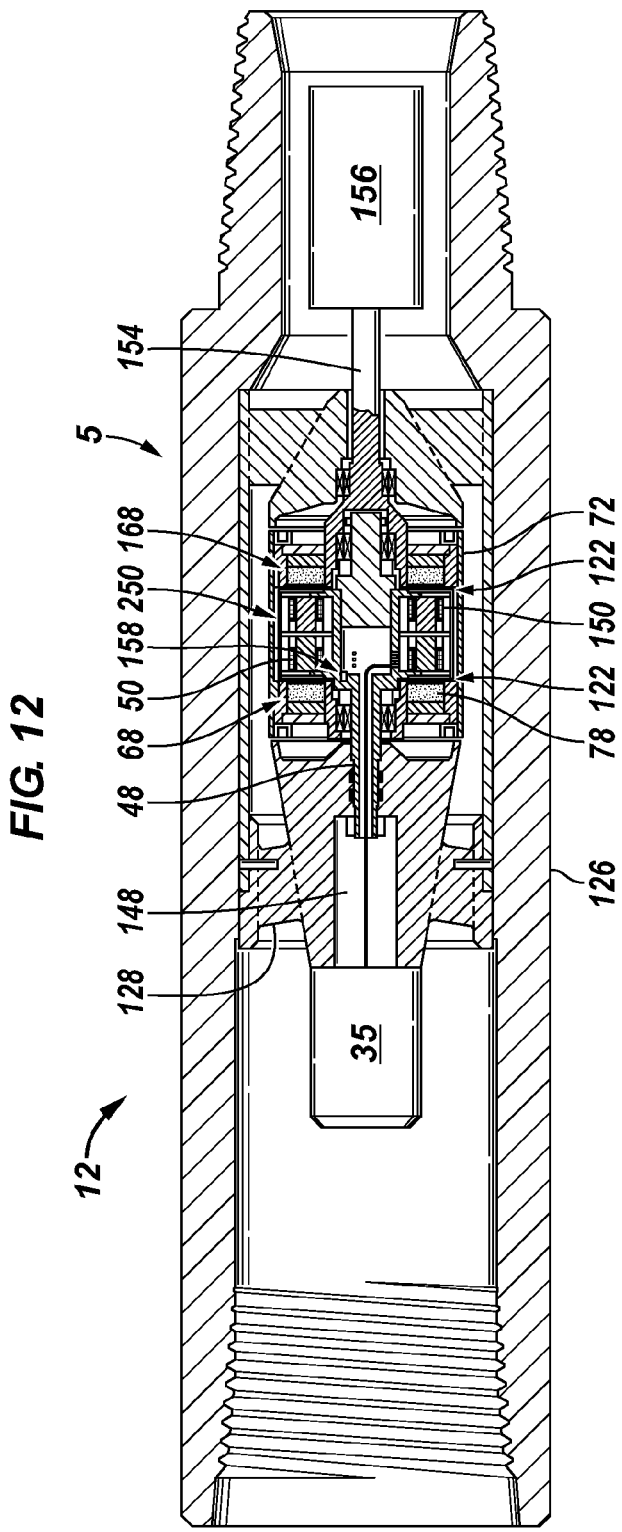
FIG. 12 illustrates a submersible electrical machine with a motor section in accordance to one or more embodiments.

FIG. 12 illustrates electrical machine 12 utilized as a motor in accordance to one or more embodiments. Electrical machine 12 includes a single machine or motor section generally denoted by the numeral 5. Motor section 5 includes a stator 250 supported at the center of the device by axle 48, e.g. non-rotating axle, and contained between two rotatable magnetic packages 68, 168 (i.e. rotors). The rotor magnetic packages are coupled together, or fixedly attached, by an attachment illustrated as tube or sleeve 72 so as to rotate in unison. Radial bearings 62 support the rotating elements. Stator 250 may include a first stator 50 having a stator face oriented toward first rotor magnetic package 68 and a second stator 150 having a second stator face oriented toward second rotor magnetic package 168. The depicted electrical machine 12 has two planar air gaps 122.

In the FIG. 12 illustration, magnetic assemblies 68, 168 are connected to rotatable motor output shaft 154. Output shaft 154 is connected to an operational device generally indicated by the numeral 156. Operational device 156 includes the illustrated downhole tools of FIG. 1, including and not limited to, MWD tool 30, LWD tool 32, and RSS 34. Axle 48 is illustrated connected at atmospheric chamber 148 to an electrical supply, for example electrical supply 35, thereby connecting stator 250 to the electrical supply. The rotors and connected output shaft 154 rotate in response to electrical power applied to stator 250 thereby operating operational device 156. The motor can be operated with rotor position sensors. For example, sensors or detectors 158 are depicted installed proximate the center of the stator to detect magnets (magnetic poles) in the rotors, for example magnetic package 68.

Figure 13:
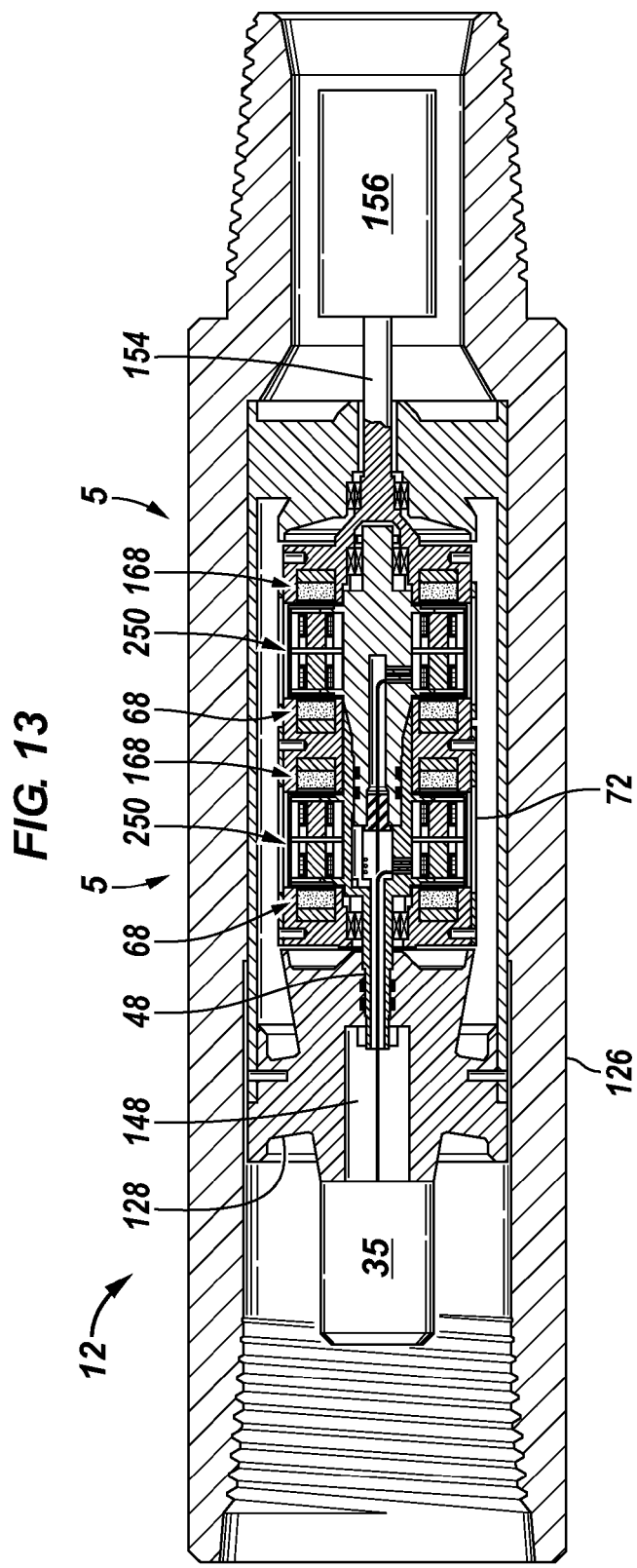
FIG. 13 illustrates a submersible electrical machine including stacked motor sections coupled with an operational device in accordance to one or more embodiments.

FIG. 13 illustrates an electrical machine having stacked motor sections 5 in accordance to one or more embodiments. Each motor section 5 includes a stator 250 having two opposing stator faces disposed between rotor magnetic package 68 and rotor magnetic package 168. Each of the rotors of the motor sections are interconnected by attachments 72 to rotate in unison and the rotors are connected to output shaft 154. By stacking the motor sections 5 more torque can be delivered to output shaft 154 to drive operational device 156.

Figure 14:
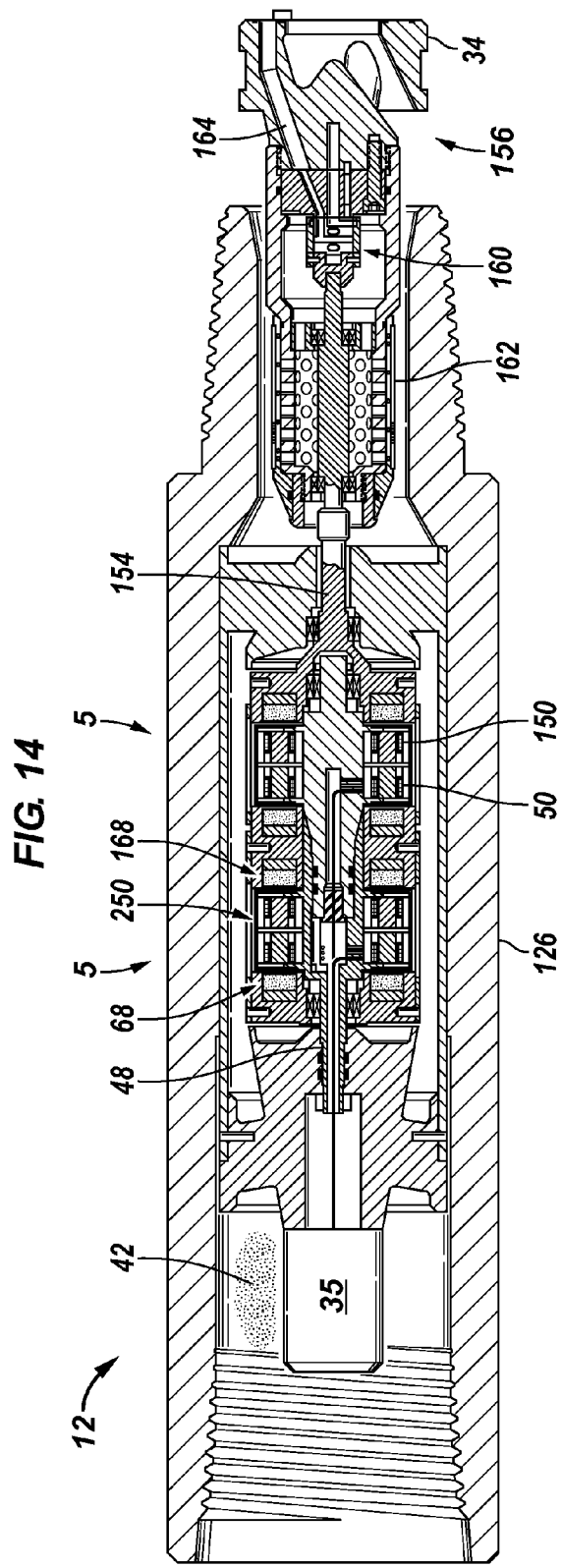
FIG. 14 illustrates a submersible electrical machine with stacked motor sections coupled to an operational device in accordance to one or more embodiments.

FIG. 14 illustrates electrical machine 12 of FIG. 13 connected to an operational device 156 having a rotary valve 160. With additional reference to FIG. 1, operational device 156 may be rotary steering system 34. Rotary valve 160 is located inside a filter 162 and is connected to output shaft 154. Electrical power supplied for example from electrical source 35 to the stators of motor sections 5 induces rotation in the rotors and the connected output shaft 154 thereby operating valve 160 to an open position for example to actuate pads 33 (FIG. 1). Fluid 42 may flow through filter 162 and flow through open rotary valve 160 into channel 164 to actuate for example pads 33 (i.e. actuators) of RSS 34.

With reference to FIGS. 1-14, electrical machine 12 is configured to be submerged in submerging fluid 42 which will penetrate or invade areas such as gaps 122 (i.e. air gaps) located between the rotors and stators and areas such as around inner sleeve 74 (FIGS. 3, 8). Stator windings 100, sealed in stator body 108, and magnetic assemblies 88, sealed in holder 84, are not in direct contact with submerging fluid 42, only with pressure. Electrical machine 12 promotes ease of maintenance when operating in aggressive fluids, for example, acidic and basic fluids and high particulate fluids such as drilling and formation fluids. For example, particulates in the submerging fluid may be ejected from air gaps 122 by centrifugal force. There is a limited magnetic attraction of the magnetic particles in air gaps 122 as the particles are perpendicular to the fluid flow direction 136.

An example of a submersible electrical machine 12 includes a first rotor magnetic package 68 spaced axially from a second rotor magnetic package 168, a first stator 50 displaced axially from the first magnetic package by a first air gap 122 and a second stator 150 displaced axially from the second magnetic package by a second air gap 122. Each magnetic package 68, 168 may form a sealed rotor. The rotors can be fixedly attached together. In accordance to some embodiments, two magnetic packages are fixedly attached with the respective magnetic poles oriented in opposite directions to form a single rotor 46. A turbine 66, e.g. blades, may be coupled with the rotors to rotate the rotors relative to the first and second stators in response to fluid flow across electrical machine 12. For example, the fluid 42 flows across the electrical machine in a direction substantially parallel to the longitudinal axis 115 of electrical machine 12. In accordance to one or more embodiments, turbine 66 is coupled with the rotors to induce rotation in the rotors relative to the fixed stators in response to fluid flow. In accordance to one or more embodiments, turbine 66 is coupled to the rotors through a connection to a rotatable shaft causing the shaft and the rotor to rotate relative to the fixed stators.

In accordance to one or more embodiments, the magnetic assemblies include a plurality of magnetic poles that are disposed or sealed in a holder 84. The holders may form a rotor face 94. Each of the stators may be a sealed stator having for example a stator core 96 disposed and sealed with a stator body 108 having a stator face 119. The sealed stator may be potted, for example fully potted, to support or counter the stress applied to the sealed stator 50, 150, 250 by the external fluid 42 pressure. The air gaps 122 are located between the adjacent rotor faces and stator faces. In accordance to one or more embodiments, the air gaps are oriented perpendicular to the axis of axle 48 and the axis of the electrical machine. In accordance with some embodiments, electrical machine 12 includes pairs of air gaps 122 to ensure axial balance of the axial force generated by the magnetic packages onto the stators. This may ensure minimum axial load on the thrust bearings 64 and reduce the friction torque.

A method in accordance to one or more embodiments, includes utilizing an electrical machine 12 that has a first magnetic assembly 88 spaced axially from a second magnetic assembly 88, a first stator 50 displaced axially from the first magnetic assembly by a first air gap 122, and a second stator 150 displaced axially from the second magnetic assembly by a second air gap, and rotating the magnetic assemblies relative to the stators in response to a fluid flowing axially across the electrical machine. In response to rotating the magnetic assemblies, electrical power may be generated and conducted to an operational device, for example and without limitation to, operational devices 156, 30, 32, 34, 38 and 40. Electrical machine 12 can be driven as a motor by providing electrical power to the stators and rotating an output shaft 154 coupled with the magnetic assemblies. The rotation of output shaft may operate a rotary mechanical load, such as rotary valve 160 (FIG. 14), MWD tool 30 modulator, or other operational devices 156 such as impellers to create fluid movement in the tubular (e.g. drill collar, tubing) or inside an actuating device.

In accordance to one more embodiments, a well system 10 includes an operational device located in a wellbore 24 and an electrical machine 12 deployed in the wellbore and functionally connected to the operational device. In accordance to one or more embodiments, electrical machine 12 includes a first magnetic package spaced axially from a second magnetic package, wherein each of the first and the second magnetic packages include magnetic poles arranged in an annular ring that is perpendicular to a longitudinal axis of the electrical machine. A first stator 50 is displaced axially from the first magnetic package by a first air gap 122, the first stator comprising a stator core 96 disposed in a stator body 108 having a first stator face 119. A second stator or stator section 150 is displaced axially from the second magnetic package by a second air gap, the second stator having a stator core disposed in a stator body having a second stator face. The first and second magnetic packages, i.e. rotors, are fixedly attached for example by an attachment such as sleeve 72 or axle 48. A turbine or impeller may be coupled with the magnetic packages to induce rotation in the magnetic packages relative to the stators in response to a fluid 42 flowing across the electrical machine in a direction parallel to the longitudinal axis. The magnetic packages may be rotated in response to electrical power applied to the stators.

An electrical machine 12 in accordance to one or more embodiments allows for the three phases of the stators 50, 150 to be wired externally and separately allowing series/parallel connection. The connection between the stators can be switched so that the stators are feeding power either in series or in parallel. The connection between the stators can be switched so that the stators are feeding power either in series connection or with a single stator while the other stator is not connected to the output load. Hysteresis is applied when switching from series to parallel and from parallel to series. The combination of the stator outputs may be performed after DC rectification is performed per stator. The outputs of corresponding phases between the stators may be shifted by a pre-defined phase to reduce the ripple after rectification. For example, the phase difference between stator is 60 degrees. Mechanical alignment or phase between the stators can be imposed by an axial keying system on axle ends. The first and second magnetic assemblies can be aligned or assembled with a specific mechanical phase by internal keying systems between the magnetic assemblies.

The foregoing outlines features of several embodiments of submersible electrical machines and methods so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A submersible electrical machine, the machine comprising:
    an axle extending along a longitudinal axis;
    a rotor configured to rotate about the longitudinal axis, the rotor including first and second magnetic packages spaced axially apart along the axle, wherein the first magnetic package has a first magnetic assembly and the second magnetic package has a second magnetic assembly that is identical to the first magnetic assembly;
    a fixed attachment between the first magnetic package and the second magnetic package; and
    the rotor deployed axially between first and second identical stators, the first stator located on the axle and displaced axially from the first magnetic package by a first air gap and the second stator displaced axially from the second magnetic package by a second air gap.

2. The machine of claim 1, wherein the first and the second air gaps are perpendicular to the longitudinal axis.

3. The machine of claim 1, wherein:
    the first magnetic package comprises a first holder having a first rotor face oriented toward the first stator, wherein the first magnetic assembly is sealed in the first holder; and
    the second magnetic package comprises a second holder having a second rotor face oriented toward the second stator, wherein the second magnetic assembly is sealed in the second holder.

4. The machine of claim 3, wherein the first magnetic assembly comprises a first ring of magnetic poles and the second magnetic assembly comprises a second ring of magnetic poles, wherein the first and second rings of magnetic poles comprise corresponding pluralities of magnets.

5. The machine of claim 3, wherein each of the rotor faces comprises a layer of wear resistant material.

6. The machine of claim 1, wherein:
    the first magnetic package comprises the first magnetic assembly sealed in a first holder having a first rotor face oriented toward the first stator, wherein the first magnetic assembly comprises a first plurality of magnets disposed on a first magnetic plate; and
    the second magnetic package comprises the second magnetic assembly sealed in a second holder having a second rotor face oriented toward the second stator, wherein the second magnetic assembly comprises a second plurality of magnets disposed on a second magnetic plate.

7. The machine of claim 6, wherein each of the rotor faces comprises a layer of wear resistant material.

8. The machine of claim 1, wherein each of the first stator and the second stator comprises a stator core sealed with a stator body.

9. The machine of claim 1, wherein each of the first stator and the second stator comprises a stator core sealed with a stator body, wherein the stator core comprises a magnetic core forming poles and stator windings disposed on the stator poles.

10. The machine of claim 9, wherein the stator core is potted with the stator body.

11. The machine of claim 1, further comprising a turbine connected to the first and the second magnetic packages, wherein rotation of the first magnetic package and the second magnetic package rotates the axle.

12. The machine of claim 1, wherein the first magnetic package and the second magnetic package are positioned between an inner sleeve and outer sleeve, and the machine further comprises journal bearings disposed in the inner sleeve, the journal bearings mating with corresponding radial and thrust bearings deployed about the axle.

13. The machine of claim 12, wherein the bearings include a wear resistant polycrystalline diamond material.

14. The machine of claim 1, wherein the first and the second air gaps are identical.

15. A well system, comprising:
    an operational device located in a wellbore; and
    an electrical machine deployed in the wellbore to drive the operational device, the electrical machine comprising:
    a rotor configured to rotate about the longitudinal axis of an axle, the rotor including first and second identical magnetic assemblies spaced axially apart along the axle;
    the rotor deployed axially between first and second stators, the first stator located on the axle and displaced axially from the first magnetic package by a first air gap and the second stator displaced axially from the second magnetic package by a second air gap; and
    a turbine coupled with the rotor to rotate the rotor relative to the first and the second stators in response to a fluid flowing across the electrical machine in a direction parallel to the longitudinal axis.

16. The well system of claim 15, wherein:
    the first magnetic assembly is disposed in a first holder having a first rotor face, the first air gap located between the first rotor face and the first stator face; and
    the second magnetic assembly is disposed in a second holder having a second rotor face, the second air gap located between the second rotor face and the second stator face.

17. The well system of claim 15, wherein the first stator and the second stator are connected to the axle and the first and the second magnetic assemblies are rotationally mounted on the axle.

18. The well system of claim 15, wherein:
    the first magnetic assembly and the second magnetic assembly are positioned between an inner sleeve and outer sleeve; and
    the turbine is connected to the outer sleeve.

19. The well system of claim 15, wherein the first and the second air gaps are identical.

20. A submersible electrical machine, the machine comprising:
- an axle extending along a longitudinal axis;
- a rotor configured to rotate about the longitudinal axis, the rotor including first and second magnetic packages spaced axially apart along the axle, wherein the first magnetic package has a first magnetic assembly and the second magnetic package has a second magnetic assembly that is identical to the first magnetic assembly;
- a fixed attachment between the first magnetic package and the second magnetic package; and
- the rotor deployed axially between first and second identical stators, the first stator located on the axle and displaced axially from the first magnetic package by a first air gap and the second stator displaced axially from the second magnetic package by a second air gap, wherein the first air gap is identical to the second air gap.

* * * * *

UNITED STATES PATENT AND TRADEMARK OFFICE
CERTIFICATE OF CORRECTION

PATENT NO. : 9,863,238 B2  
APPLICATION NO. : 13/954865  
DATED : January 9, 2018  
INVENTOR(S) : Jerome Miles et al.

Page 1 of 1

It is certified that error appears in the above-identified patent and that said Letters Patent is hereby corrected as shown below:

On the Title Page

Item (72) Inventors:
Fourth inventor's name is corrected from "Scott Wolston" to --Scott Woolston--

Signed and Sealed this
Twenty-second Day of December, 2020

Andrei Iancu
*Director of the United States Patent and Trademark Office*